(12) United States Patent
Nikolova et al.

(10) Patent No.: US 7,573,866 B2
(45) Date of Patent: Aug. 11, 2009

(54) METHOD FOR FINDING OPTIMAL PATHS USING A STOCHASTIC NETWORK MODEL

(75) Inventors: Evdokia V. Nikolova, Somerville, MA (US); Matthew E. Brand, Newtonville, MA (US); Michael Mitzenmacher, Lexington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 499 days.

(21) Appl. No.: 11/512,849

(22) Filed: Aug. 30, 2006

(65) Prior Publication Data

US 2009/0175171 A1    Jul. 9, 2009

(51) Int. Cl.
*H04L 12/28* (2006.01)
(52) U.S. Cl. .................................... 370/351; 370/229
(58) Field of Classification Search ................ 370/229, 370/248, 254, 255, 351
See application file for complete search history.

(56) References Cited

U.S. PATENT DOCUMENTS 6,067,572 A * 5/2000 Jensen et al. ................ 709/241

7,391,732 B1 * 6/2008 Cortez et al. ................ 370/238

OTHER PUBLICATIONS

Nielsen, "Route Choice in Stochastic Time-Dependent Networks", Ph.D. Thesis, Dec. 2003, ISSN 1600-8987, University of Aarhus, Department of Mathematical Science, as accessed via Internet on Feb. 19, 2009.*
Nielsen: "Route choice in stochastic time-dependent networks," Dec. 2003.
Mirchandani et. al.: "Routing with nonlinear multiattribute cost function," Mar. 1993.
Mirchandani et. al.: "Locations of medians on stochastic networks," Oct. 1977.

* cited by examiner

*Primary Examiner*—Kwang B Yao
*Assistant Examiner*—Andrew Lai
(74) *Attorney, Agent, or Firm*—Dirk Brinkman; Gene Vinokur (57) ABSTRACT

A method finds an optimal path from a source to a destination. The possible paths from the source to the destination are represented as a stochastic graph of nodes connected by edges. Each edge has an independent probability distribution over a cost of the edge. A constraint for reaching the destination is defined. The graph is reduced to a relatively small set of deterministic minimum cost problems, which can be solved to determine an optimal path that maximizes a probability of reaching the destination within the constraint.

13 Claims, 6 Drawing Sheets

METHOD FOR FINDING OPTIMAL PATHS USING A STOCHASTIC NETWORK MODEL

GOVERNMENT INTEREST

The work leading to the present invention was supported in part by an NSF Graduate Fellowship, NSF grant CCR-0324914, NSF grants ANI-0225660 and ITR-0219018. The government has certain rights in the invention.

FIELD OF THE INVENTION

The invention relates generally to finding minimum cost paths, and more particularly to finding optimal paths modeled with a stochastic network.

BACKGROUND OF THE INVENTION

Finding minimum cost or "shortest" paths, generally optimal paths or "most likely to succeed" paths, is important in many practical transportation and communication applications. The problem is to find a route from a source to a destination under certain constraints. For example, a best geographical route to the airport before a departure time, a best route on the drive home before running out of fuel, or a best route in a network to send packets with minimum delay.

The invention is concerned with paths that can be modeled as a stochastic network (graph). A stochastic network includes nodes connected by edges. The edges represent the individual paths that can form a potential optimal route, and the nodes are intermediate points where alternative paths can be selected for a particular route. In a stochastic network, a cost of traversing an edge (path) is drawn randomly according to a probability distribution associated with the edge. Typically, the cost distribution represents a 'length' of the edge, or the travel time to traverse the edge. This is how the real world works.

Because it is difficult to define the meaning of stochastic shortest paths, it is also difficult to formalize the problem. When the edges that model the paths are modeled by probability distributions, the shortest paths could determine an average, minimize a combination of mean and variance, or minimizing some other specified criterion. In addition, the shortest paths can be found adaptively or non-adaptively. Adaptive methods are most common, perhaps because a non-adaptive minimization of the expected path length trivially reduces to a deterministic shortest path problem.

Most prior art methods minimize an expected length of paths from the source to the destination, or a combination of expected lengths and expected costs such as bicriterion problems, J. Mote, I. Murthy, and D. Olson, "A parametric approach to solving bicriterion shortest path problems," European Journal of Operational Research, 53:81-92, 1991, and S. Pallottino and M. G. Scutella, "Shortest path processes in transportation models: Classical and innovative aspects," Technical Report TR-97-06, Universita di Pisa Dipartimento di Informatica, 1997.

Some methods optimize a non-linear function of the path length. Other methods define a decision-theoretic framework, R. P. Loui, "Optimal paths in graphs with stochastic or multi-dimensional weights," Communications of the ACM, 26:670-676, 1983. There, the optimal path maximizes an expected utility for a class of monotonically increasing utility functions.

An adaptive method for finding shortest paths that maximizes the probability of arriving before the deadline is described by Y. Fan, R. Kalaba, and I. J. E. Moore, "Arriving on time," Journal of Optimization Theory and Applications, Vol. 127, No. 3, pp. 485-496, December 2005. Formulations of this type with a nonlinear objective function, though perhaps most useful in practice, are few, because the hardness of the problem arises and accumulates from many levels, e.g., combinatorial, distributional, analytic, functional, to list a few. For example, in the absence of randomness, the combinatorial nature of the problem may be hard to approximate. In the absence of a graph structure, the objective function may be difficult to optimize.

A stochastic shortest paths model can effectively reduce the above difficulties.

Most prior art methods that operates on stochastic shortest paths use adaptive processes. There, the selection of the best next path is based on information about realized edge lengths so far. Most of the adaptive methods focus on minimizing expected length; few consider minimizing a non-linear function of the length and only give approximate heuristic processes.

The most relative method is that of Loui. Loui considers a general utility function of the path length which is monotone and non-decreasing, and proves that the expected utility becomes separable into the edge lengths only when the utility function is linear or exponential. In that case, the path that maximizes the expected utility can be found via traditional shortest path process. For general utility functions, Loui describes a process based on a certain enumeration of paths.

Mirchandani and Soroush give exponential processes and heuristics for quadratic utility functions, P. Mirchandani and H. Soroush, "Optimal paths in probabilistic networks: a case with temporary preferences," Computers and Operations Research, 12(4):365-381, 1985. For non-monotone utility functions that use penalties, Nikolova et al., give hardness results and pseudo-polynomial processes, E. Nikolova, M. Brand, and D. R. Karger, "Optimal route planning under uncertainty," Proceedings of International Conference on Automated Planning and Scheduling, 2006.

SUMMARY OF THE INVENTION

The embodiments of the invention provide a method for finding minimum cost (shortest) paths from a source to a destination under some predetermined constraint, e.g., a deadline. The paths are modeled as a stochastic network (graph) of nodes and edges. The invention considers the problem of finding the optimal paths in the graph with independent and randomly distributed edge lengths (costs).

The goal is to maximize a probability that the path lengths do not exceed a given threshold value (constraint), such as the deadline time. The invention provides a surprising exact process for the case of normally distributed edge lengths, which is based on a quasi-convex maximization.

DETAILED DESCRIPTION OF THE PREFERRED EMBODIMENT

Stochastic Shortest Path Definition

Figure 1:
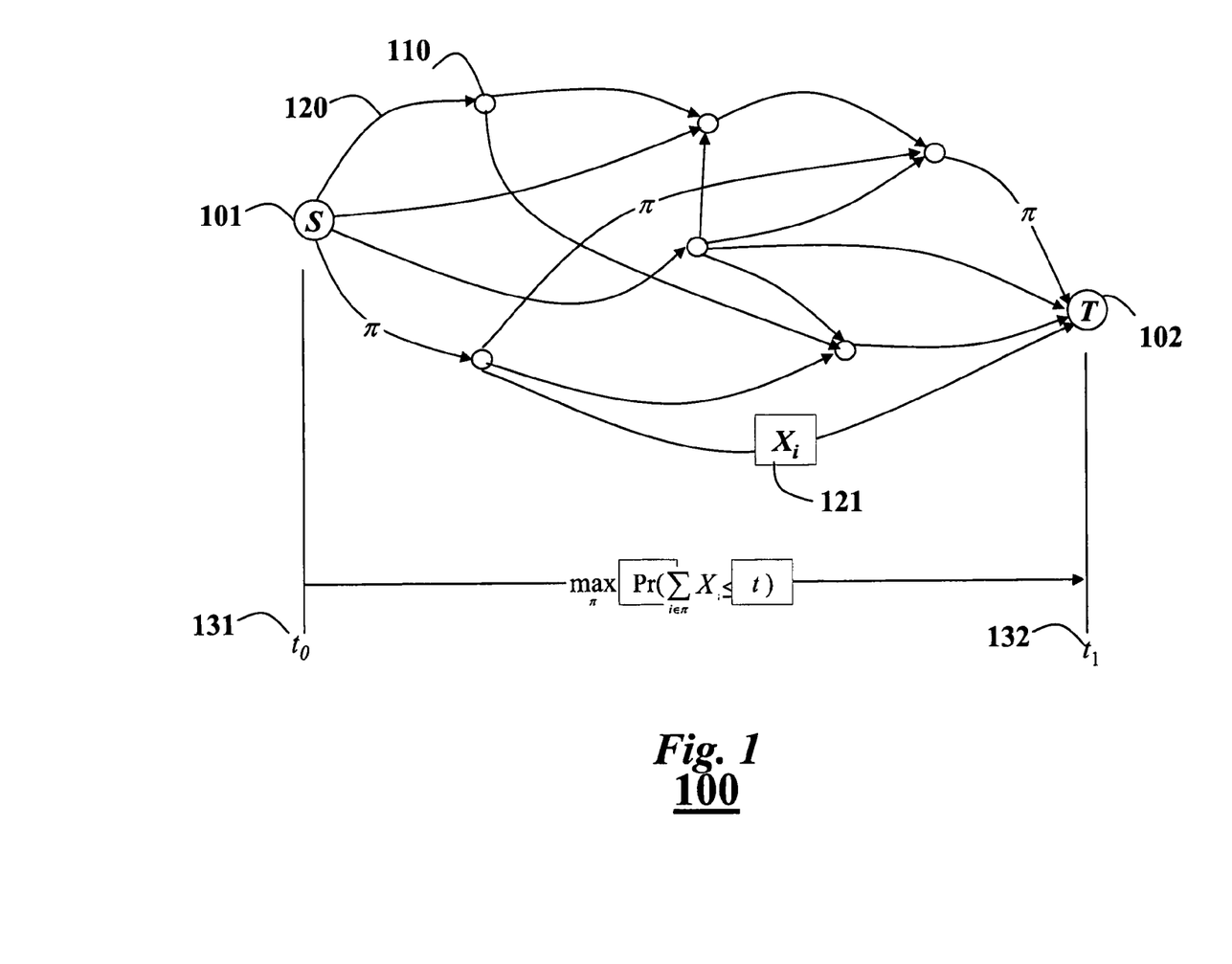
FIG. 1 is graph representing paths from a source to a destination according to an embodiment of the invention.

FIG. 1 shows a graph 100 representing paths from a source (S) 101 to a destination (7) 102 according to our invention. The graph includes nodes 110 and edges 120 connecting the nodes. Formally, the graph 100 is G=(V, E), with |V|=n nodes and |E|=m edges. The edges represent paths. It should be realized for real world applications the number of edges can be in the many thousands.

We provide a method for finding an optimal path from the source to the destination, subject to some constraint. As used herein, optimal can have various meanings, depending on the particular application. Optimal can mean least cost, least time, a maximized probability of reaching the destination within the constraint, or a most likely to succeed path, etc.

Each edge $E_i$ 120 has an associated independent random variable cost expressed as a probability distribution, e.g., length, or travel time, $X_i$ 121. The exact meaning of the cost depends on a particular application. The probability of the cost can be distributed normally, additively, exponentially, or distributed according to a Bernoulli function. The normal probability distribution of the cost can be expressed in terms of its mean $\mu$ and its variance $\sigma^2$.

We have a constraint t. The constraint can be expressed as a time interval t from a start time $t_{0\ 1}$ 131 to a deadline time $t_1$ 132, i.e., $t=t_1-t_0$. It should be understood, that constraints other than time can be used for other applications. For example, the constraint can be an actual total budget for achieving some goal.

We would like to find the optimal paths $\pi$ from S to T that maximizes the probability that we reach the destination within the constraint, e.g., time interval t.

Thus, we solve $$\max_\pi Pr\left(\sum_{i \in \pi} X_i \leq t\right), \quad (1)$$

for all possible paths $\pi_i$ from the source to the destination.

We find the optimal path by constructing and solving an equivalent parametric shortest path problem on the same graph. The graph G distinguishes the source S 101 and destination T 102. Each path $\pi_i$ 120 is given a cost parameter dependent weight $u_i+\lambda w_i$, where $u_i$ and $w_i$ are nonnegative weights, and the parameter $\lambda$ varies in a range [0, $\infty$). The parametric shortest paths problem finds parameter values (breakpoints) $\lambda$ at which the shortest path changes.

We refer to the number of breakpoints as the parametric shortest path complexity, and note that the complexity is equal to the number of paths, which are shortest for the non-empty open interval [0, $\infty$), counting paths of identical parametric weight as one. We call these the optimal paths.

We establish a connection between the stochastic shortest paths with normal distributions and the parametric shortest paths problem. This enables us to apply our average and smoothed results for the former to the parametric shortest path setting as well.

Figure 2:
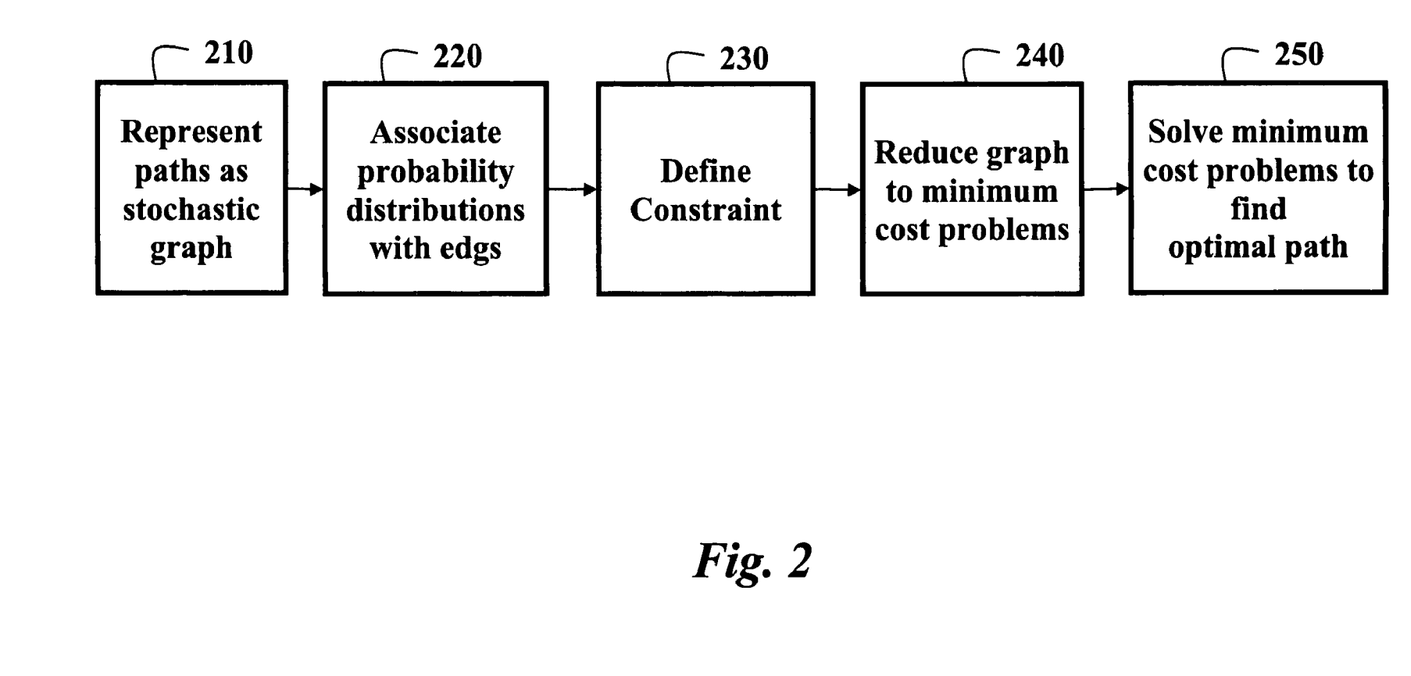
FIG. 2 is a flow chart of a method for finding an optimal path according to an embodiment of the invention.

FIG. 2 shows the steps of a general method for finding the optimal path thought the graph 100 according to an embodiment of the invention. We represent 210 all possible paths from the source to the destination as the stochastic graph 100 of nodes connected by edges. Each edge is associated 220 with an independent probability distribution over a cost of the path. We define 230 a constraint for reaching the destination. Then, we reduce 240 the graph to a relative small number of deterministic minimum cost problems.

By "relatively small" we mean that the number of problems is constant or at most linear with respect to the number of edges. The prior art solutions, at best are exponential or worse. Typically, the prior art methods use approximate heuristics with no known bounds on error and processing times. Whereas, our method provides provable bounds, and computable process times. The relatively small number of deterministic problems are solved 250 to determine an optimal path that maximizes a probability of reaching the destination within the constraint. The evaluation of a relative small number of candidate paths can be done using deterministic minimum cost processes.

Quasi-Convex Maximization

We define convex functions and their generalization to quasi-convex functions and state the main property of their global maxima. Let C be a convex set.

Definition 2.1: A function $f((C) \rightarrow (-\infty,\infty))$ is convex if for all x, y in the set C and $\alpha$ [0,1], $f(\alpha x+(1-\alpha)y) \leq \alpha f(x)+(1-\alpha)f(y)$. The functions is quasi-convex if all its lower level sets are convex.

Informally, quasi-convex functions have a convex cross-section at any level.

Definition 2.2: We say that x is an extreme point of the set C if x cannot be represented as a convex combination of two other points in the set C, $x=\alpha y+(1-\alpha)z$ for y, z in C, $\alpha$ in the range (0; 1))$\Rightarrow$y=z=x.

Theorem 2.3: Let $C \subset \mathfrak{R}^m$ be a compact convex set. A quasi-convex function $f: C \rightarrow \mathfrak{R}$ that attains a maximum over the set C, attains the maximum at some extreme point of C.

Figure 3:
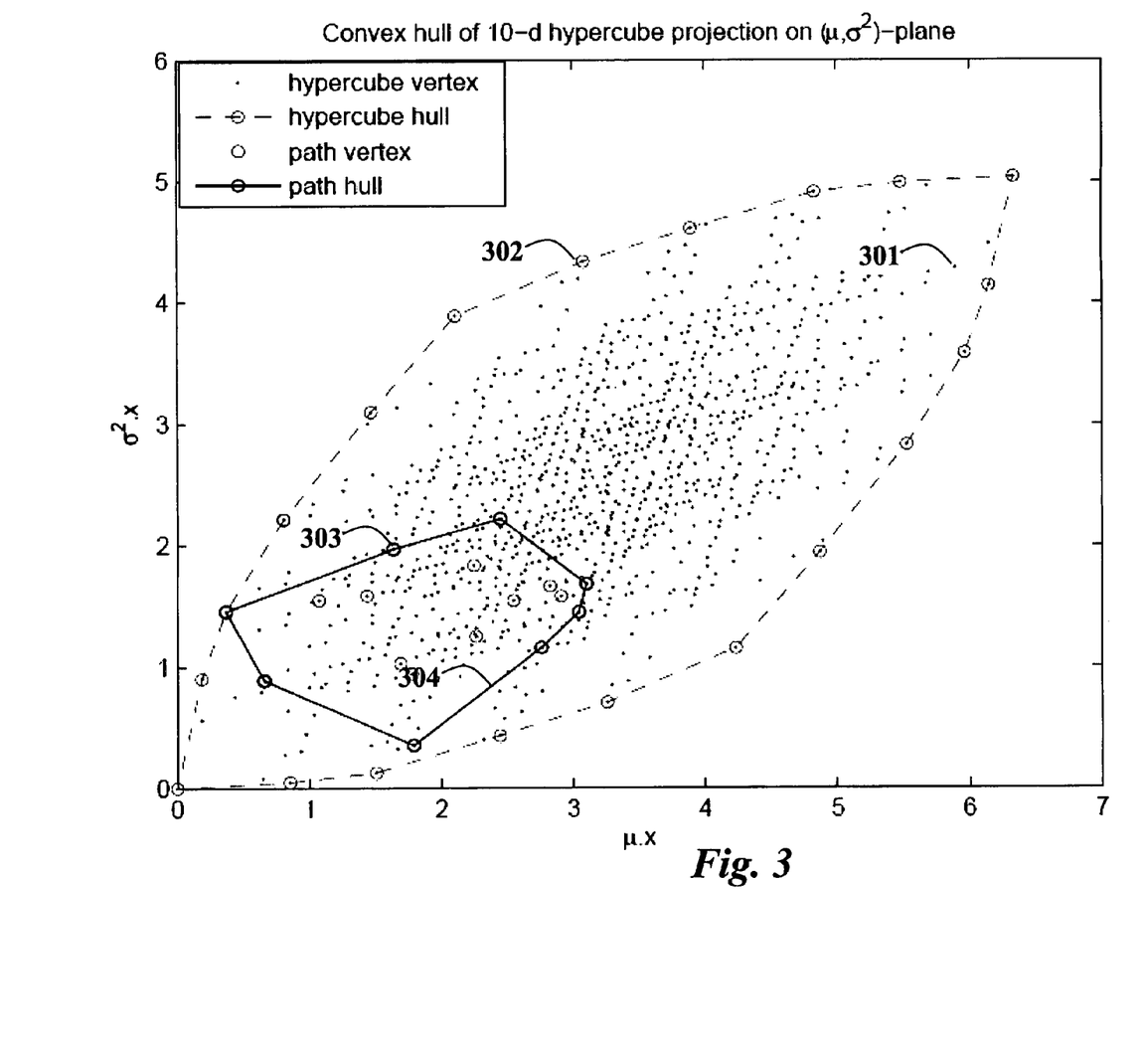
FIG. 3 is a projection of the graph of FIG. 1 onto a mean-variance plane.

We provide a few more definitions. The shadow of the convex set in $\mathfrak{R}^m$ onto the two-dimensional plane 200 is the orthogonal projection of the convex set onto the plane. The dominant of the set C in $\mathfrak{R}^m$ is defined as the set of all points that are greater than a point in C, $\{x \in \mathfrak{R}^m | X \geq y$ for some y in the set C.

Stochastic Shortest Paths with Normal Distributions

Therefore, as shown in FIG. 3, we first project the graph 100, which is geometrically a hypercube 301 of nodes and has a hypercube hull 302 onto a mean-variance ($\mu$, $\sigma^2$) plane including path vertices 303 and a path hull 304, which is a polygon. The path vertices 303 in the projection correspond to the costs 121 of path, e.g., length, or time.

The projection is performed as follows. For any path through the graph, construct a vector of 0's and 1's indicating which edges are used by the path. This vector points at a corner of a hypercube in $R^{|E|}$, where |E| is the number of edges. The convex hull of all corners corresponding to valid paths is called the path polytope. Each vertex of the polytope corresponds to a valid path.

We also construct a vector of all mean parameters and associated with each edge, and another vector of all variance parameters associated with each edge. These two vectors span a plane in $R^{|E|}$. We project the polytope onto that plane to obtain a shadow, the convex path hull 304. Vertices 303 of the shadow path hull correspond to paths in the original graph that extremize a parametric cost function that is related to our original cost function above. The optimal path is identified by only inspecting a small subset of vertices on the lower-left side of the polygon, i.e., the vertices with small variances and small means. The edges in the polygon 304 have no meaning.

We apply a quasi-convex maximization to the graph with normally distributed edge lengths. We select the best route to reach the destination from the source by or before given deadline time t. The problem has natural applications to transportation networks with uncertain traffic conditions, such as reaching the airport on time.

Figure 4:
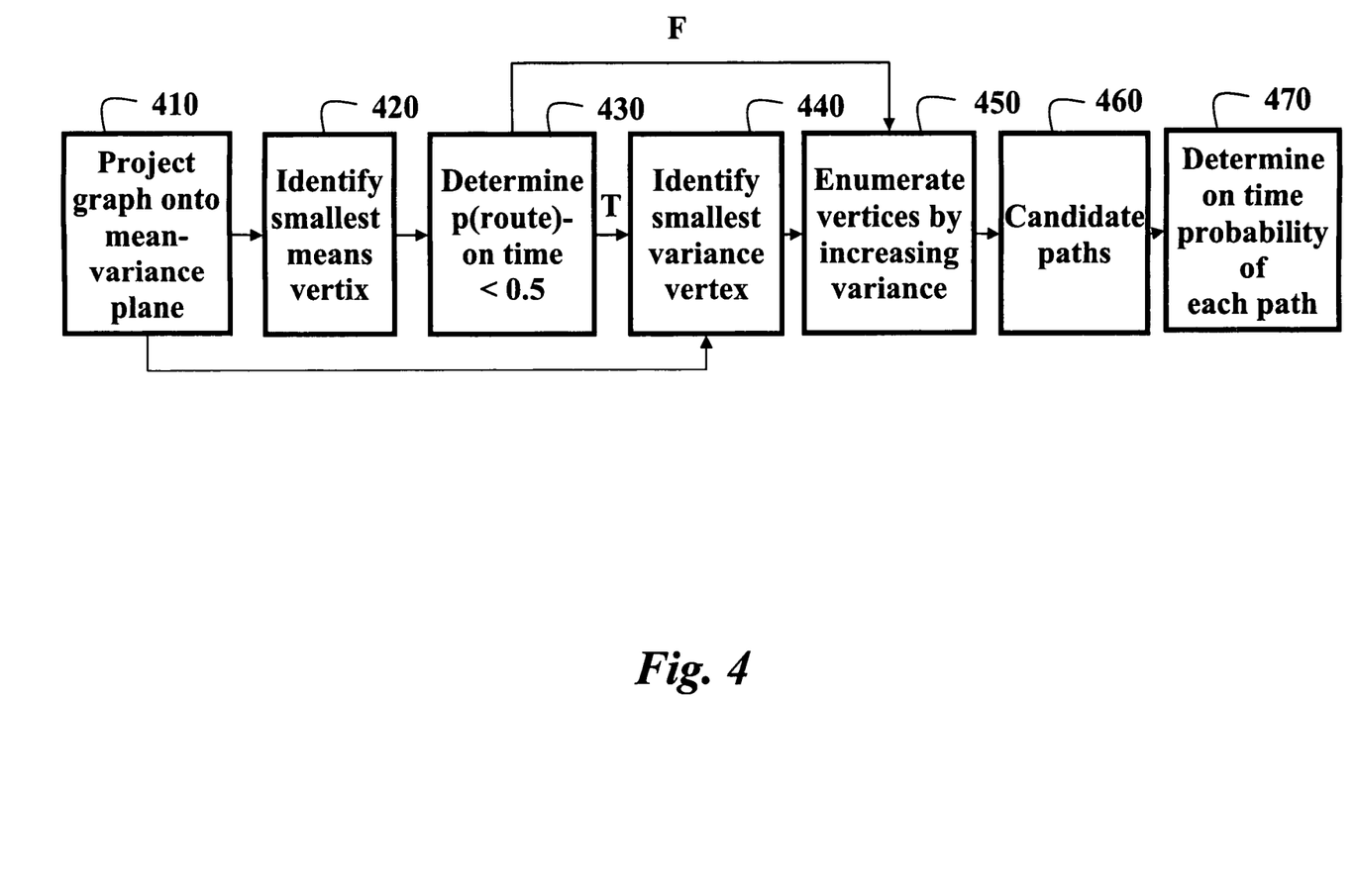
FIG. 4 is a flow chart of a method for finding an optimal path according to an embodiment of the invention where a probability distribution is normal.

FIG. 4 shows the steps for the reducing when the costs are normally distributed. We project 410 the graph 100 onto the mean-variance plane and identify 440 the smallest variance vertex. We also identify 420 the smallest means vertex, and determine 430 if a probability of route being on time is less than 0.5. If false, we enumerate 450 the variance vertices in an increasing order, otherwise we first identify 440 the smallest variance vertex and then enumerate 450. This gives us a small number of possible candidate paths that could be optimal and for which the problem needs to be solved. Then, we determine the on time probability of each path, and select the optimal path.

Assume each edge i has independent normally distributed length $X_i \sim N(\mu_i, \sigma_i)$ 121, where $\mu$ is a mean, and $\sigma$ a variance. Our goal is to maximize $$\max_\pi Pr\left(\sum_{i \in \pi} X_i \leq t\right). \tag{2}$$

For any path $\pi$, this probability is given by $$Pr\left(\sum_{i \in \pi} X_i \leq t\right) = Pr\left(\frac{\sum X_i - \sum \mu_i}{\sqrt{\sum \sigma_i^2}} \leq \frac{t - \sum \mu_i}{\sqrt{\sum \sigma_i^2}}\right) = \Phi\left(\frac{t - \sum \mu_i}{\sqrt{\sum \sigma_i^2}}\right),$$

where $\Phi(.)$ is a cumulative distribution function of the standard normal random variable $N(0, 1)$. Because $\Phi$ is monotone increasing, the problem is equivalent to finding the ST-path which maximizes its argument, $$\max_\pi \frac{t - \sum_{i \in \pi} \mu_i}{\sqrt{\sum_{i \in \pi} \sigma_i^2}}. \tag{3}$$

The objective in Equation (3) cannot be separated into edges costs and does not satisfy suboptimality. Therefore, a dynamic programming approach based on substructure fails. To better understand the properties of the objective function, we formulate the objective function as a continuous optimization problem over the path polytope in $\Re^m$, where m is the number of edges.

We index all edges 120 by $1, 2, \ldots, m$, and represent each edge subset by its incidence vector x, with $x_i=1$, if edge i is in the subset, and $x_i=0$ otherwise. All $2^m$ subsets of edges correspond to the vertices of a unit hypercube in $\Re^m$. The ST-path polytope, or the path polytope for short, is the convex hull of incidence vectors of simple ST-paths. The polytope is a subset of the unit hypercube in $\Re^m$, and the vertices of the polytope are a subset of the vertices of the hypercube. Thus, the optimal ST-path is a solution to maximize $$\begin{aligned}\text{maximize} \quad & \frac{t - \mu \cdot x}{\sqrt{\sigma^2 \cdot x}} \\ \text{subject to} \quad & x \in \text{path polytope} \\ & x \in \{0, 1\}^m\end{aligned} \tag{4}$$

where by $\{0, 1\}^m$ we denote the set of 0-1 vectors of length m.

Projecting the path polytope onto the span of vectors $\mu=(\mu_1, \ldots, \mu_m)$ and $\sigma=(\sigma^2_1, \ldots, \sigma^2_m)$ defines the convex path hull 304, which we call the path polytope shadow.

The objective in Equation (4) is not separable, far from linear or quadratic and not even convex. This places the objective in a category of programming and combinatorial optimization problems, for which there are no general efficient solutions. Although the integer constraints usually cause the main difficulty, in this case it is not clear how to solve this problem, even in the fractional version.

It turns out that our objective has a special structure, which forces its maximum to lie on the boundary of the feasible set. In particular, the structure is quasi-convex on a subset of the path polytope and monotone in $\mu.x$ and $\sigma^2.x$ on the remaining subset of the polytope. This can be unfortunate because we do not have a polynomial description of the boundary of the path polytope, or even its shadow.

For example, computing the rightmost and uppermost vertices of the path polytope shadow corresponds to the finding the longest path, in terms of the edge means and the edge variances respectively. Therefore, the computation of the path convex hull is, in general, strongly NP-hard. On the other hand, we can efficiently find the extreme points on the dominant of the shadow hull, because the extreme points optimize a linear objective $$\lambda\mu+(1-\lambda)\sigma^2, \text{ for } \lambda[0; 1].$$

Our main Theorem 3.3, below, shows that for sufficiently early departure time, which eliminating the incidence of a longest path problem, our objective is quasi-convex. We first state a lemma about the correspondence of the stochastic and parametric shortest paths problems.

Lemma 3.1: There is a one-to-one correspondence between the extreme points on the shadow of the path polytope dominant on the plane spanned by vectors $u=(u_1, \ldots, u_m)$, $w=(w_1, \ldots, w_m)$, and the breakpoints of the parametric shortest path problem with edge weights $u_i+\lambda w_i$.

By Lemma 3.1, the results for the complexity of the parametric shortest paths problem imply equivalent bounds for the number of extreme points on the shadow dominant.

Theorem 3.3. When the deadline t is no less than the mean of the smallest mean path, the solution to Equation (4) is an extreme point of the dominant of the path polytope shadow.

Proof.

We first consider the relaxed version of Equation (4). Denoting $x^1=\mu_x$ and $x^2=\sigma^2.x$. This system becomes equivalent to $$\begin{aligned}\text{maximize} \quad & \frac{t - x_1}{\sqrt{x_2}} \\ \text{subject to} \quad & (x_1, x_2) \in \text{path polytope shadow } S.\end{aligned}$$

The induced objective $$f(x_1, x_2) = \frac{t - x_1}{\sqrt{x_2}}$$

is quasi-convex on a subset of a feasible set $\overline{S}$, which is non-empty assuming there is a path with a mean less than t. Because $x_1 = \mu.x < t$, the value of $f(x_1, x_2)$ on this feasible subset is positive, and must contain the maximum. Therefore, the objective function $f(x_1, x_2)$ is quasi-convex on the feasible set $\overline{S}$, i.e., the path polytope shadow to the left of $x_1 = t$. By Theorem 2.3, the maximum is at an extreme point of $\overline{S}$. Furthermore, because $f(x_1, x_2)$ is monotone decreasing in both $x_1$ and $x_2$, the solution is an extreme point of the dominant of the shadow, to the left of $x_1 = t$.

Now, any extreme point of the shadow is the projection of an extreme point of the original path polytope m, which has integer coordinates. Hence, the optimal solution of the relaxed program of Equation (4) is also a solution to the integer program of Equation (5). Each extreme point on the shadow dominant is the solution to a linear program min $$\min c.x \tag{6}$$

subject to x∈shadow path polytope for some $c \geq 0$.

Equivalently, each extreme point corresponds to a path minimizing $c_1 x_1 + c_2 x_2$, where $x_1$ is the total mean of the path and $x_2$ is the total variance, so for $c_1, c_2 \geq 0$, it can be found via any shortest path process.

To find all extreme points on the shadow dominant, we start with its two endpoints: the leftmost point, which corresponds to the path with smallest mean, and the bottom-most point, which is the path of smallest variance.

Having found them, we denote them $\pi_1 = (m_1, s_1)$, $\pi_2 = (m_2, s_2) \in \Re^2$, where $m_i$ is the mean and $s_i$ the variance of path $\pi_i$. We then solve Equation (6) with $(c_1, c_2) = (-(s_2 - s_1)/(m_2 - m_1))$, if $m_2 \neq 0$, otherwise $(c_1, c_2) = (1, 0)$. Suppose the new solution is $\pi_3 = (m_3, s_3)$. If different from both $\pi_1$ and $\pi_2$, we repeat the procedure for finding a vertex between paths $\pi_1, \pi_3$ and between $\pi_2, \pi_3$, etc. Clearly in this way we find all vertices on the shadow.

When the departure time is closer to the deadline, so that any shortest path has a mean greater than t, the optimal value of the program is be negative and the objective function is decreasing in the mean of the path, and increasing in the variance. In this case, the solution to the relaxed program is on the upper-left boundary of the shadow, between the left-most extreme point of lowest mean and the uppermost extreme point of highest variance. Because finding the simple path with highest variance is strongly NP-hard.

We do not expect to find a good polynomial-time approximation. In addition, the objective function in Equation (5) is no longer quasi-convex on the feasible set intersected with $\{x_1 | x_1 > t\}$. Even if we could find the fractional solution, it is not guaranteed to coincide with the integer solution to Equation (4).

We described a pseudo-polynomial process that may possibly include non-simple paths, which is polynomial in the number of nodes n and the maximum edge variance $\sigma^2$. This process constructs a dynamic programming table as follows.

For each possible value $s = 0, 1, \ldots, \sigma^2$ of a path variance, and for each node v, determine the predecessor of node v on a path from the source S to node v of variance s and smallest mean. At the end, we have $\sigma^2$ paths from the source to the destination, one for each possible variance s, and smallest mean for that variance value.

More precisely, for each node v and variance s, we solve the suboptimal equations $$\Phi(v, s) = \min_{v' \sim v} [\Phi(v', s - \sigma^2_{v'v}) + \mu_{v'v}],$$

$$\pi(v, s) = \arg \min_{v' \sim v} [\Phi(v', s - \sigma^2_{v'v}) + \mu_{v'v}],$$

where $\Phi(v, s)$ is the mean of the smallest mean path from the source to node v of variance exactly s. Path $\pi(v, s)$ is the predecessor of node v on that path, and for a neighboring node $v_0$ of node v. Note that the assumption of independent edge lengths ensures the separability of the path variance as a sum of edge variances.

Then, we find the optimal ST-path by computing the objective function value (t-path mean)/($\sqrt{\text{pathvariance}}$), for each partially optimized path of variance s and select the path with smallest objective value.

Average and Smoothed Complexity

If the edge weight vectors u, w are uniformly random unit vectors or fixed vectors, which are slightly perturbed, then the expected number of extreme points on the path polytope shadow is linear, and consequently, our process described above has a small expected polynomial running time. The techniques described here are motivated by techniques for the polynomial simplex process for linear programming.

Note that the vertices of the path polytope P are a subset of the vertices of the unit hypercube, in particular:

Fact 1. Each edge of the polytope P has length at least 1.

Fact 2. The polytope P is contained in the unit hypercube, which in turn is contained in a ball with radius $\sqrt{m}/2$.

Average Bounds

Theorem 4.1: Let u, w∈$\Re^m$ 2 be uniformly random unit vectors and let V be their span. Then, the expectation of the number of edges of the projection of P onto V is at most $2\sqrt{2}m$.

Proof: By Fact 2, the perimeter of the shadow of P onto V is bounded by $\pi\sqrt{m}$. Next, for each edge I of the polytope P, denote by $S_I(V)$ the event that edge I appears in the shadow, and let l(I) be the length of the edge in the shadow. The sum of expected edge lengths in the shadow is at most equal to the biggest possible perimeter:

$$\sum_I E[l(I)] = \sum_I E[l(I) | S_I(V)] Pr[S_I(V)] \leq \pi\sqrt{m}.$$

By Lemma 4.2 below, $$E[l(I) | S_I(V)] \geq \frac{1}{2\sqrt{2m}}.$$

Therefore, $$E[\text{number of shadow edges}] = \sum_I Pr[S_I(V)] \leq 2\sqrt{2}\,\pi m,$$

where m is the dimension of the polytope P, in our case, it is the number of edges of the stochastic network.

Lemma 4.2: For all edges I of the polytope P, $$E[l(I) \mid S_I(V)] \geq \frac{1}{2\sqrt{2m}}.$$

Proof: If an edge I of the polytope appears in the shadow, the edge makes a small angle with the projection plane V, $$\Pr_V\left[\cos(\theta_I(V)) \geq \frac{1}{\sqrt{2m}} |S_I(V)|\right] \geq \frac{1}{2}.$$

Because any edge in the polytope P has length at least 1 (by Fact 1 above), the length of the edge in the shadow is at least $\cos(\theta_1(V))$, and the expectation the edge appears in the shadow as $$E[l(I) \mid S_I(V)] \geq \frac{1}{\sqrt{2m}} \frac{1}{2}.$$

Smoothed Bounds

We tighten our average-case bounds to obtain a smoothed analysis. That is, rather than projecting onto a uniformly random 2-plane, we start with an arbitrary, and possibly worst-case, a 2D-plane and perturb the plane slightly. Then, we show that the expected number of edges of the projection of P onto our 2D-plane is polynomial in m and inversely polynomial in the size of the perturbation.

Our distribution on 2D-planes involves exponential random variables. We recall that a variable x that is exponentially distributed with expectation λ has cumulative density function $$\Pr[x \leq t] = 1 - e^{-t/\lambda},$$

and a probability density $$f(t) = \frac{1}{\lambda} e^{-t/\lambda}$$

for all t≧0: This allows us to define a perturbation of a vector.

Definition 4.3: For any ρ>0, and any unit vector u, we define a ρ-perturbation of u to be a random unit vector v selected as follows:

Randomly select an angle θ∈[0,π] from the exponential distribution of expectation ρ, restricted to the range [0,π].

Select v uniformly at random from the set of vectors that make an angle of θ with u. The result is as follows.

Theorem 4.4: Let U=span($u_1$, $u_2$) be an arbitrary 2D-plane. Let $v_1$ and $v_2$ be ρ-perturbations of $u_1$ and $u_2$, respectively, and let V=span($v_1$, $v_2$). The expected number of edges of the projection of P onto V is at most $4\pi\sqrt{2m/\rho}$, for $\rho<1/\sqrt{m}$. By the same argument used in Section 4.1, this follows from the following lemma:

Lemma 4.5: With the random variables defined above, $$\Pr_{v1,v2}[\cos(\theta_I(V)) \leq \epsilon \mid S_I(V)] \leq 4(\epsilon/\rho)^2.$$

This lemma allows both $v_1$ and $v_2$ to be drawn from ρ-perturbed distributions, as opposed to requiring one of them to be uniformly random.

Naturally, the smaller the perturbation, the weaker the bound in the theorem. Note that by Lemma 3.1, these bounds imply linear, in the number of graph edges, average and smoothed bounds for the number of optimal paths in the parametric shortest paths problem as well.

Additive, Exponential and Bernoulli Distributions

We extend our model to distributions other than the normal. For edge lengths coming from a Poisson or a gamma distribution with a fixed second parameter, or more generally distributions which are additive and satisfy stochastic dominance, we show that the problem reduces to the deterministic shortest path problem with edge weights equal to the parameter of the corresponding distribution. For the case of exponential and Bernoulli random variables, whose sums are hard to compute exactly, we have polynomial and quasi-polynomial time approximation schemes, respectively PTAS and QPTAS.

Poison and Gamma Distribution

The sum of two independent Poisson random variables with rates (means) $\mu_1$ and $\mu_2$ is another Poisson random variable with a mean equal to the sum. In addition, the Poisson distribution satisfies stochastic dominance. Namely, its cumulative distribution function for a lower rate $\mu_1$ is entirely above the cumulative distribution function for a higher rate $\mu_2$.

Figure 5:
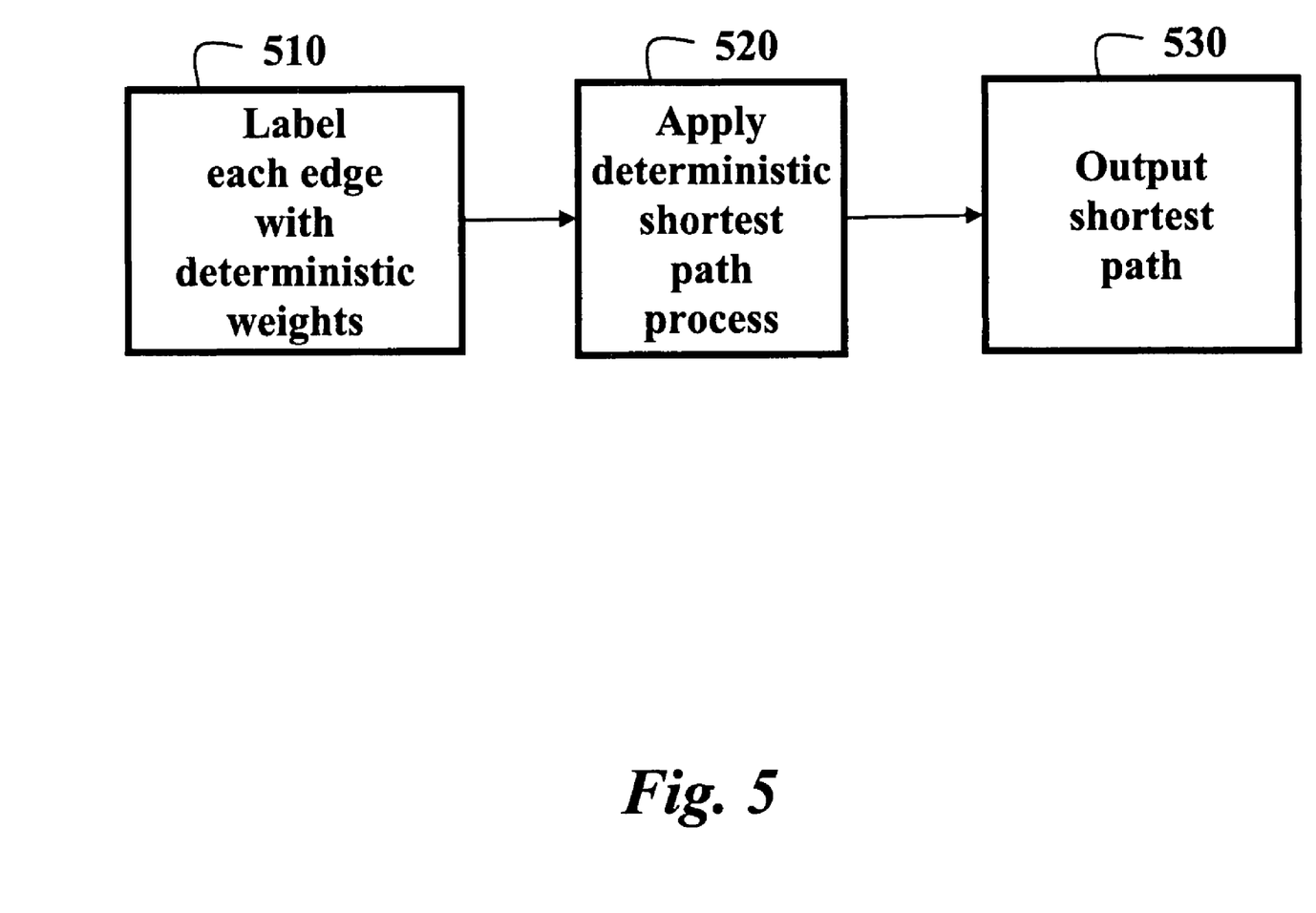
FIG. 5 is a flow chart of a method for finding an optimal path according to an embodiment of the invention where a probability distribution is additive.

FIG. 5 shows the method for finding the shortest path when the probability distributions of the costs are additive. Each edge is labeled 510 with a weight L. A deterministic minimum cost process is applied 520 to the weighted edges, and the optimal path can be output 530.

Specifically, let D(λ) be any single parameter additive distribution, namely the sum of two independent random variables with distributions D($\lambda_1$) and D($\lambda_2$) is another random variable with the same distribution and parameter equal to the sum, D($\lambda_1+\lambda_2$).

We also use D(λ) to denote the random variable with this distribution. Assume in addition that the distribution D satisfies stochastic dominance, that is Pr(D(λ)≦t)≧Pr(D($\lambda_2$)≦t), whenever $\lambda_1 \leq \lambda_2$.

Another realistic example of such a distribution is the gamma distribution gamma(a, b) with a fixed shape parameter b. This defines a family of random variables with arbitrary means (variances), but with a fixed mean-to-variance ratio.

Suppose the random length of edge i is $X_i \sim D(\lambda_i)$. Now, despite the non-separable objective function, the additivity of the distribution together with stochastic dominance makes the problem separable:

$$Pr\left(\sum_{i \in \pi} X_i \leq t\right) = Pr\left(\sum_{i \in \pi} D(\lambda_i) \leq t\right) = Pr\left(D\left(\sum_{i \in \pi} \lambda_i\right) \leq t\right) \leq Pr(D(\lambda') \leq t),$$

where the last inequality follows from the stochastic dominance property of the distribution. Thus, a path has a higher probability of not exceeding the threshold t if and only if its distribution parameter is smaller. With this, the optimal path is the one that has the smallest sum of distribution parameters along its links and can be found exactly by applying 520 the deterministic shortest path process.

Exponential PTAS and Bernoulli QPTAS

Unlike the Poisson distribution, the exponential and Bernoulli distribution are not additive. Therefore, it is not possible to write a simple closed form expression for the objective probability function. We describe a polynomial-time approximation scheme, based on dynamic programming over a quantization of the probability distribution.

Figure 6:
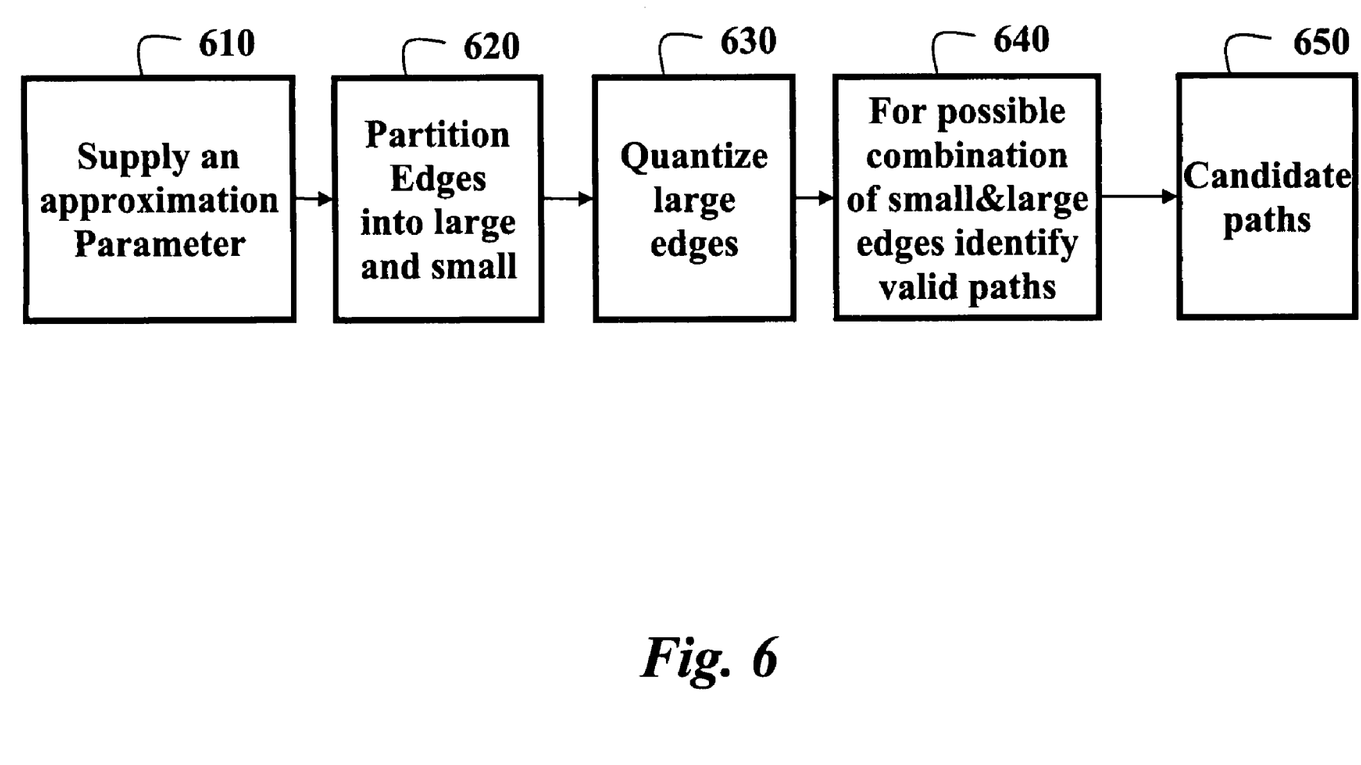
FIG. 6 is a flow chart of a method for finding an optimal path according to an embodiment of the invention where a probability distribution is a Bernoulli function.

FIG. 6 shows the method for finding the shortest path when the probability distributions is exponential or a Bernoulli function. We begin with the graph, constraint, as described above, and also supply 610 an approximation parameter. We partition 620 the edges into two sets, one set of large parameters and one set of small edges. The large edges are quantized 630. For each possible combination of small and large edges and a particular node v in the graph, identify 640 any path that is consistent with the combination of edges from the source to the node v. The identified paths are a small number of paths to evaluate 650 with some deterministic minimum cost process, and to select the path with the maximum probability as described above.

More precisely, we give a bicriterion approximation, which is given a lateness tolerance p and for $\epsilon > 0$, it finds a path $\pi$ satisfying $$Pr\left(\sum_{i \in \pi} X_i < t(1+\epsilon)\right) > 1 - \epsilon p.$$

Theorem 5.1: An approximately optimal path is $Pr[\Sigma_{i \in \pi} X_i > (1+\epsilon)] \leq p(1+\epsilon)$ A similar quantization yields a quasi-polynomial time approximation scheme for the case of Bernoulli distributions.

EFFECT OF THE INVENTION

The invention provides a method for finding stochastic shortest paths with independent random edge lengths. The method can be used to find the shortest (least cost) path from a source to a destination, under some cost constraint. The path can be a route to the airport on or before a deadline, a path for routing a message through a network having quality-of-service or cost-control guarantees, a shipping relay for merchandise via boat, truck, and plane. The method can also be used to identify most reliable route, circuit, or relay for monitoring, protection applications. The method can also be applied to a transaction-processing pipeline where a latency guarantee is desired, e.g., Internet-based sales.

It should be noted that the method is unusual in that it is not based on dynamic programming. Although the problem is inherently discrete, in its core are properties from a continuous optimization.

Remarkably, changing the edge length distributions alters the problem nature significantly. Embodiments of the invention are provided for additive stochastically dominant distributions, exponential distributions, and Bernoulli distributions.

Although the specific embodiments of the invention have been described using a minimum cost path application, it should be understood that the same basic techniques can be used for other applications. For example, the graph can represent possible ways of achieving a goal (destination), from an initial condition (source). In this case, the probability distributions represent uncertain costs associated with each step of achieving the goal, and the constraint is staying within a budgeted total cost.

Alternatively, the source can be an initial state of some process or machine, and the destination a final states. In this case, the edges represent state transitions, and their associated costs. The method now finds an optimal set of transitions to reach the final state.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

The invention claimed is:

1. A computer implemented method for finding an optimal path from a source to a destination, comprising the steps of:
representing possible paths from a source to a destination as a stochastic graph of nodes connected by edges;
associating with each edge an independent probability distribution over a cost of the edge;
defining a constraint for reaching the destination;
reducing the graph to a set of deterministic minimum cost problems, wherein the number of said problems in the set is constant or linear with respect to the edges; and
solving the set of deterministic minimum cost problems to determine an optimal path that maximizes a probability of reaching the destination within the constraint.

2. The method of claim 1, in which the probability distribution is normal, and each probability distribution has a mean and a variance, and the reducing further comprises:
projecting a path polytope of the stochastic graph onto a mean and variance plane to produce a path polytope shadow in a form of a convex polygon having a subset of vertices corresponding to candidate optimal paths.

3. The method of claim 1, in which the probability distributions of the costs of the edges are additive and satisfy stochastic dominance, and the set of deterministic minimum cost problems includes a single element.

4. The method of claim 1, in which the probability distributions are exponential and the reducing further comprises quantizing each probability distribution, and the solving applies recursively a dynamic program to the quantized probability distributions.

5. The method of claim 1, in which the probability distributions are Bernoulli functions, and the reducing further comprises quantizing each probability distribution according to an approximation parameter, and the solving applies recursively a dynamic program to the quantized probability distributions.

6. The method of claim 1, in which the graph represents possible ways of achieving a goal, and the probability distributions represent uncertain costs associated with each step of reaching the goal, and the constraint is not exceeding a budgeted total cost.

7. The method of claim 1, in which the source represents an initial state and the destination represents a final state, and the edges represent state transitions and associated costs.

8. The method of claim 1, in which the costs represents time, and the constraint is a deadline time.

9. The method of claim 1, in which the set of deterministic minimum cost problems is constant with respect to the number of edges and possible paths.

10. The method of claim 1, in which the set of deterministic minimum cost problems is linear with respect to the number of edges and possible paths.

11. The method of claim 2, further comprising:
identifying vertices with relatively small variances and means as candidate paths to evaluate.

12. The method of claim 1, in which the path is a geographical route.

13. The method of claim 1, in which the path is a route in a network.

* * * * *